(12) United States Patent
Yoshida

(10) Patent No.: US 10,481,544 B2
(45) Date of Patent: Nov. 19, 2019

(54) STAPLE NEEDLE REPLENISHING FOR BINDING DEVICE HAVING NEEDLE BINDING AND NON-NEEDLE BINDING

(71) Applicant: Kenji Yoshida, Yamanashi-ken (JP)

(72) Inventor: Kenji Yoshida, Yamanashi-ken (JP)

(73) Assignee: CANON FINETECH NISCA INC., Misato-Shi, Saitama (JP)

( * ) Notice: Subject to any disclaimer, the term of this patent is extended or adjusted under 35 U.S.C. 154(b) by 0 days.

(21) Appl. No.: 15/992,941

(22) Filed: May 30, 2018

(65) Prior Publication Data

US 2018/0348692 A1 Dec. 6, 2018

(30) Foreign Application Priority Data

Jun. 1, 2017 (JP) .................................. 2017-109086

(51) Int. Cl.
| | |
|---|---|
| *B65H 37/04* | (2006.01) |
| *G03G 15/00* | (2006.01) |
| *B42C 1/12* | (2006.01) |
| *H04N 1/00* | (2006.01) |
| *B42B 4/00* | (2006.01) |
| *B42B 5/00* | (2006.01) |

(52) U.S. Cl.
CPC ............ *G03G 15/6544* (2013.01); *B42B 4/00* (2013.01); *B42B 5/00* (2013.01); *B42C 1/12* (2013.01); *B65H 37/04* (2013.01); *H04N 1/00631* (2013.01); *H04N 1/00639* (2013.01); *B65H 2301/4382* (2013.01); *B65H 2301/51611* (2013.01); *B65H 2301/51616* (2013.01); *B65H 2408/1222* (2013.01); *B65H 2601/3222* (2013.01); *B65H 2801/27* (2013.01)

(58) Field of Classification Search
CPC .... G03G 15/6541; B65H 37/04; B65H 31/34; B65H 2301/51616; B31F 5/02; B31F 2201/00; B31F 2301/43828
See application file for complete search history.

(56) References Cited

U.S. PATENT DOCUMENTS

| | | | | |
|---|---|---|---|---|
| 9,221,291 | B2 * | 12/2015 | Kubo ........................ | B42C 1/12 |
| 9,567,183 | B2 * | 2/2017 | Komiyama ............... | B42B 5/08 |
| 9,969,144 | B1 * | 5/2018 | Awano ...................... | B42B 4/00 |
| 2015/0021145 | A1 * | 1/2015 | Sekigawa ................. | B42B 9/00 |
| | | | | 198/602 |
| 2015/0035226 | A1 * | 2/2015 | Nishi ................... | B65H 29/125 |
| | | | | 271/207 |
| 2015/0183255 | A1 * | 7/2015 | Nakagomi ............. | B65H 43/02 |
| | | | | 412/11 |

(Continued)

FOREIGN PATENT DOCUMENTS

| | | |
|---|---|---|
| JP | 2012-027118 A | 2/2012 |
| JP | 2014-061964 A | 4/2014 |
| JP | 2015-009966 A | 1/2015 |

(Continued)

*Primary Examiner* — Patrick H Mackey
(74) *Attorney, Agent, or Firm* — Manabu Kanesaka

(57) ABSTRACT

Disclosed herein is a sheet binding apparatus that comprises a first binding unit provided and a second binding unit configured to perform needle binding on sheets, and a second binding unit configured to perform non-needle binding on sheets. A needle replenishing position where needles are replenished in the first binding unit is set in the vicinity of the second binding unit.

12 Claims, 9 Drawing Sheets

(56) References Cited

U.S. PATENT DOCUMENTS

2015/0183610 A1* 7/2015 Matsuki ................ B65H 37/04
270/58.08

FOREIGN PATENT DOCUMENTS

| JP | 2015-016970 A | 1/2015 |
| JP | 2015-016972 A | 1/2015 |
| JP | 2015-209335 A | 11/2015 |

* cited by examiner

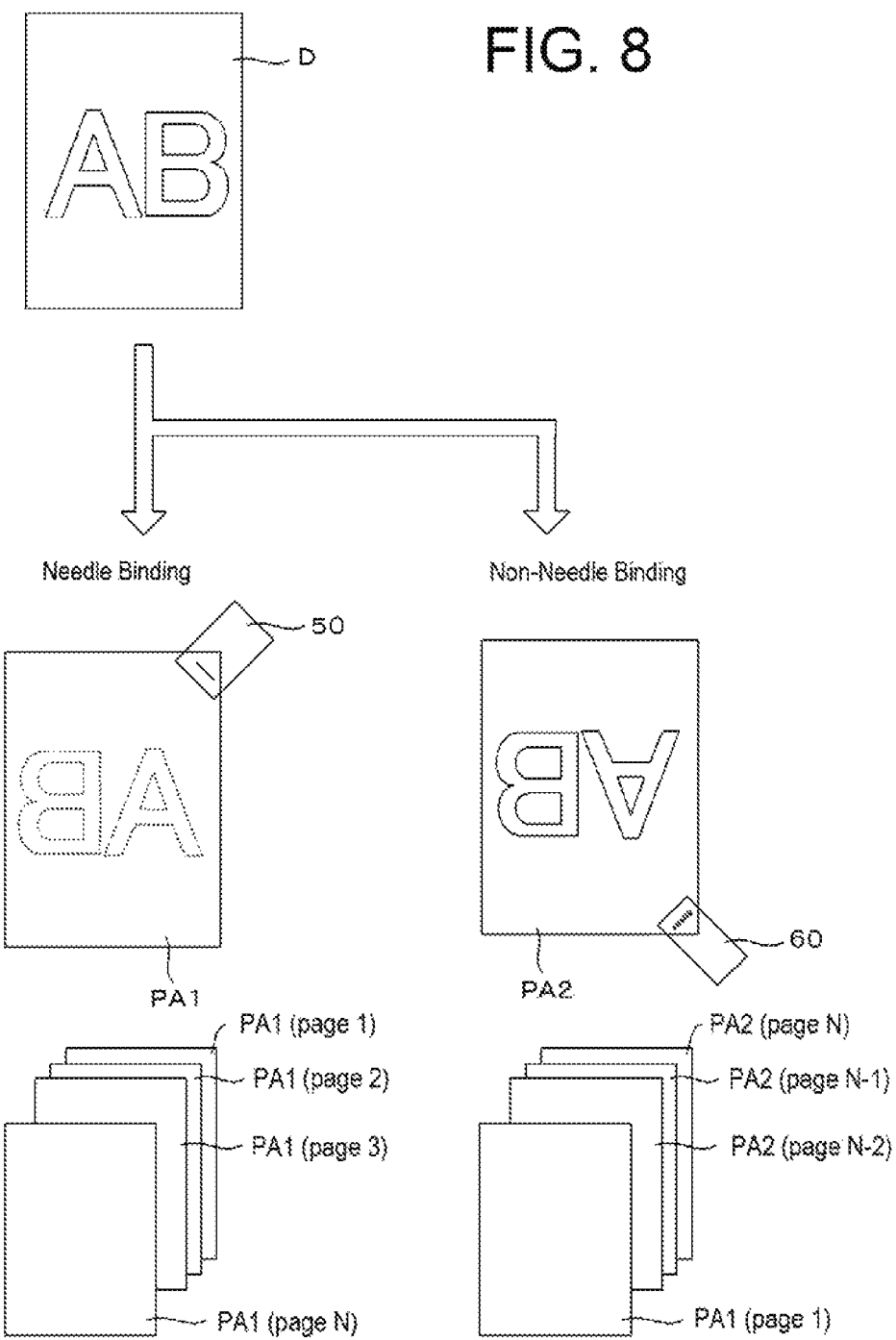

STAPLE NEEDLE REPLENISHING FOR BINDING DEVICE HAVING NEEDLE BINDING AND NON-NEEDLE BINDING

BACKGROUND OF THE INVENTION

1. Field of the Invention

This invention relates to a sheet binding apparatus configured to align sheets and bind them together and, more particularly, having binding means of different types. The invention also relates to an image forming system.

2. Description of the Related Art

Hitherto known well is a sheet binding apparatus configured to align sheets and bind them together in an image forming apparatus such as a copier or a printer.

In such a sheet binding apparatus the sheets may be bound in a so-called "needle binding method" using needles to bind the sheets, or in a so-called "non-needle binding method" using no needles to bind the sheets. In a non-needle binding method, the sheets are pressed, entangling the sheets' fibers and thereby binding the sheets. In another non-needle binding method, holes are cut in a part of each sheet and this part is folded back and passed through the holes of the next sheet, thereby binding the sheets together.

As is disclosed in JP 2015-16970 A, a sheet binding apparatus has a needle binding mechanism and a non-needle binding mechanism, which bind sheets in the needle binding method and the non-needle binding method, respectively. In this binding apparatus, the non-needle binding mechanism is secured at one side of the sheets, and the needle binding mechanism is moved along the side of the sheets. Either the needle binding mechanism or the non-needle binding mechanism is selected and used to bind the sheets.

In the sheet binding apparatus disclosed in JP 2015-16970 A, however, the needle binding mechanism is moved to that side of the sheets, which opposes the side where the non-needle binding mechanism is provided, thereby to achieve maintenance including replenishing needles at the other side of the sheets. Consequently, maintenance must be performed on the non-needle binding mechanism, at the side opposite to the needle binding mechanism, which is laborious.

SUMMARY OF THE INVENTION

In view of the above, this invention has been made. A sheet binding apparatus according to the invention comprises a first binding unit and a second binding unit. The first binding unit is configured to perform needle binding on sheets. The second binding unit is provided at one end of one side of each sheet and performs non-needle binding on the sheets. A needle replenishing position where needles are replenished in the first binding unit is set near the second binding unit.

Therefore, the first binding unit can be replenished with needles and the second binding unit can receive maintenance, at the same side of the apparatus and therefore with ease.

BRIEF DESCRIPTION OF THE DRAWINGS

FIG. 8 is a diagram showing how the sheets are transported in accordance with the sheet-binding mode, in the sheet binding apparatus according to this invention;

DETAILED DESCRIPTION OF THE PREFERRED EMBODIMENTS

Figure 1:
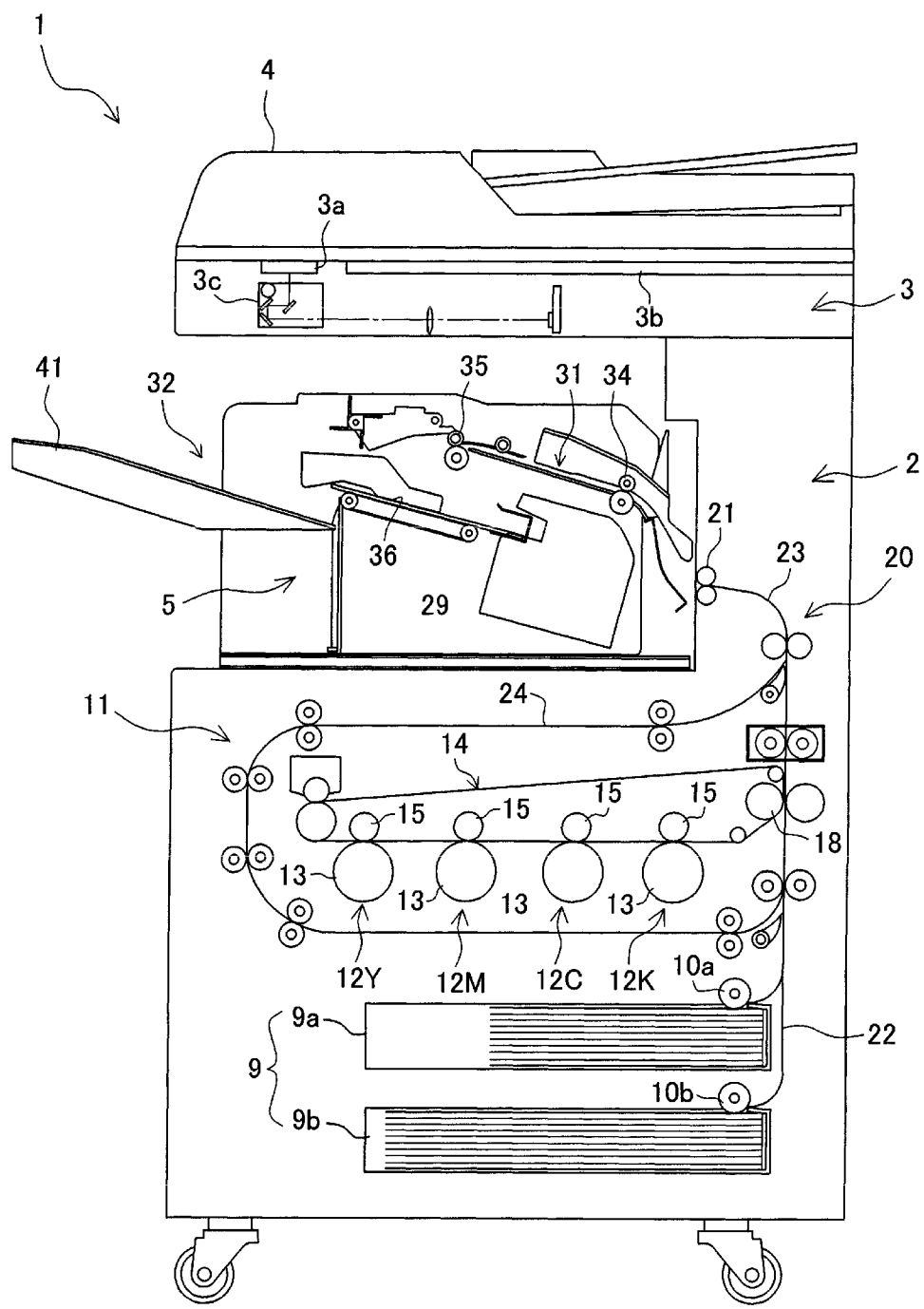
FIG. 1 is a schematic diagram showing the overall configuration of an image forming system.

FIG. 1 is a schematic diagram showing the overall configuration of an image forming system 1. The image forming system 1 comprises an image forming apparatus 2, an sheet reading apparatus 3, an sheet feeding apparatus 4, and a sheet post-processing (sheet binding) apparatus 5.

Figure 2:
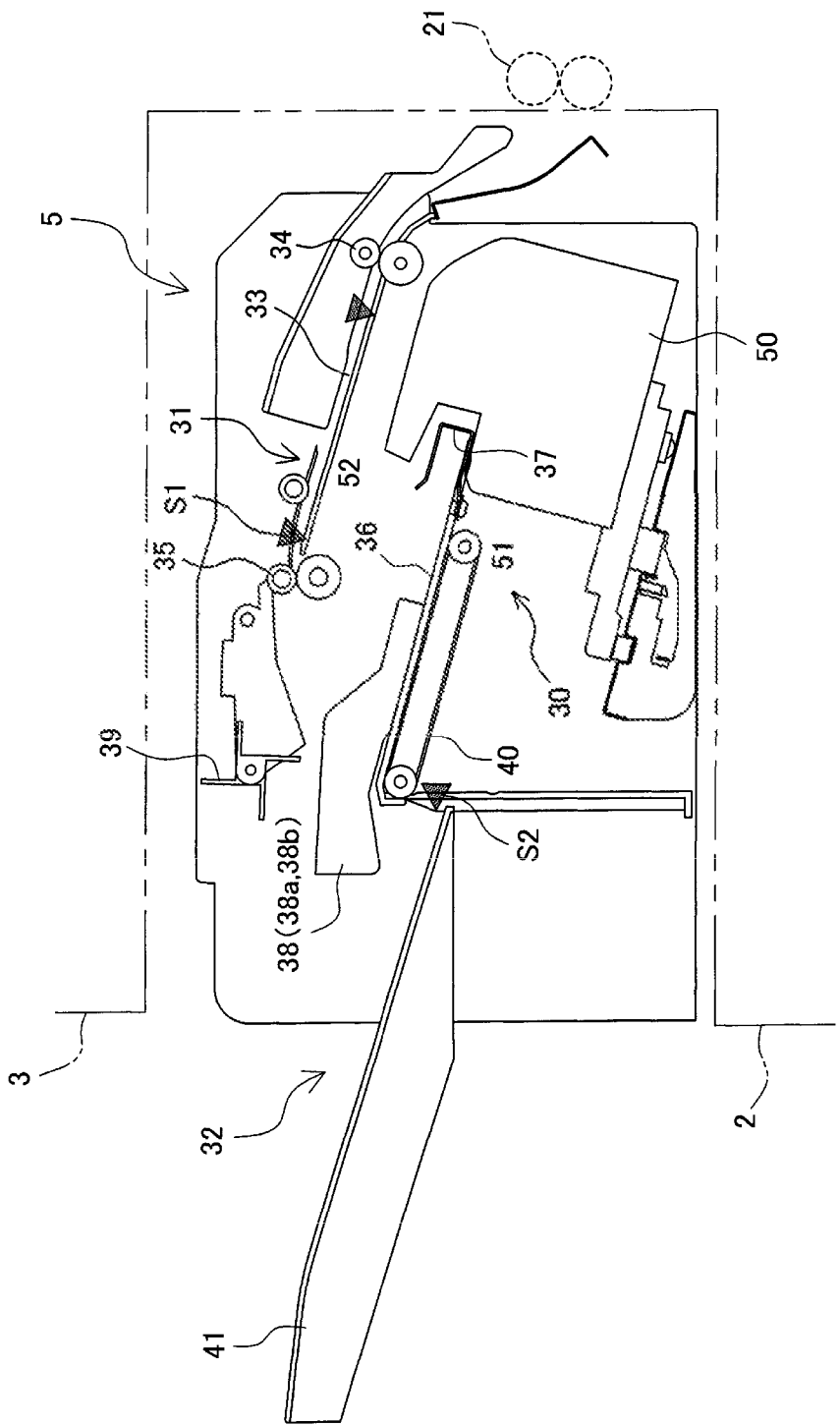
FIG. 2 is an enlarged cross-sectional diagram showing the configuration of a sheet binding apparatus according to this invention.

The image forming apparatus 2 is, for example, a copier, a printer, or a facsimile. As shown in FIG. 2, the image forming apparatus 2 comprises a sheet feeding section 9, an image forming section 11, and an ejecting section 20. The sheet feeding section 9 has a two sheet cassettes 9a and 9b in which sheets are loaded. The image forming section 11 prints images on the sheets supplied from the sheet feeding section 9. The ejecting section 20 ejects any sheet on which an image has been formed. The image forming apparatus 2 according to this embodiment is an internal post-processing type wherein the sheet post-processing apparatus 5 is arranged in the sheet-ejecting space provided above the image forming section 11.

In the sheet feeding section 9, feeding rollers 10a and 10b are provided to feed sheets from the sheet cassettes 9a and 9b, respectively. The sheets so fed are supplied to the image forming section 11 along a sheet feeding path 22.

As shown in FIG. 1, the image forming section 11 has four image forming units 12Y, 12M, 12C and 12K configured to form a yellow (Y) image, a magenta (M) image, a cyan (C) image, and a black (K) image, respectively. The four image forming units 12Y, 12M, 12C and 12K have the same configuration, and each has a photosensitive drum 13. Each image forming unit has, though not shown, a charger, an LED head, a developer, a cleaner, and a static eliminator that are arranged along the circumferential surface of the photosensitive drum 13.

In each of the image forming units 12Y, 12M, 12C and 12K, the charger electrically charges the surface of the photosensitive drum 13 uniformly. Then, the LED head applies a laser beam to the surface of the photosensitive drum 13, in accordance with the data received from, for example, a personal computer (e.g., PC, not shown). A latent image is therefore formed on the surface of the photosensitive drum 13. Further, the developer applies toner to the latent image formed on the surface of the photosensitive drum 13, changing the latent image to a visible image as a toner image. Next, an intermediate transfer unit 14 transfers the toner image to a recording sheet. The residual toner, not used in forming the toner image, is removed from the photosensitive drum 13 by the cleaner which has a blade contacting the surface of the photosensitive drum 13. Then, the static eliminator removes the surface charge of the photosensitive drum 13. Thus, the image forming process is completed.

The ejecting section 20 comprises an ejecting path 23 and ejecting rollers 21. The ejecting rollers 21 eject any sheet having an image formed in the image forming section 11 to the sheet post-processing apparatus 5 through the ejecting path 23. In the ejecting section 20, the sheet once transported to the sheet processing apparatus B is switched back and transported into a circulation path 24 and fed back into the image forming section 11, whereby an image is formed on the reverse side of the sheet. Any sheet having images formed on one side or both sides is, if necessary, switched back in the circulation path 24 and set in page order with respect to other sheets, and is then fed through the ejecting path 23 and ejected by the ejecting rollers 21.

Above the sheet feeding space provided in the upper part of the image forming apparatus 2, the sheet reading apparatus 3 is arranged. The sheet reading apparatus 3 has a first platen 3a, a second platen 3b, and an image reading unit 3c. The image reading unit 3c reads each original sheet fed to the first platen 3a by the sheet feeding apparatus 4. The image reading unit 3c reads the original sheet placed on the second platen 3b. Using the image data so read, the image forming apparatus 2 forms an image on a sheet.

FIG. 2 is an enlarged cross-sectional diagram showing the configuration of the sheet post-processing apparatus 5. As seen from FIG. 1, the sheet post-processing apparatus 5 is arranged in the space between the image forming apparatus 2 and the sheet reading apparatus 3. The sheet post-processing apparatus 5 comprises a post-processing section 30 configured to bind sheets, a transporting section 31 configured to transport sheets to the post-processing section 30, and an accumulating section 32 configured to accumulate the sheets transported from the post-processing section 30.

The transporting section 31 has a transport path 33, into which the sheets having images formed thereon are sequentially fed from the image forming apparatus 2. The transport path 33 extends straight, in a substantially horizontal direction. At the entrance side of the transport path 33, a pair of feed-in rollers 34 is arranged. At the exit side of the transport path 33, a pair of feed-out rollers 35 is arranged, and a feed-out sensor S1 is arranged to detect any sheet fed by the pair of feed-out rollers 35. The entrance side of the transport path 33 is coupled to the outlet port of the image forming apparatus 2. The feed-in rollers 34 receive any sheet ejected by the ejecting rollers 21 and transports the sheet to the feed-out rollers 35.

The post-processing section 30 comprises a processing tray 36, an end-aligning plate 37, a pair of side-aligning plates 38a and 38b, two binding units 50 and 60 (only unit 50 is illustrated in FIG. 2), a paddle 39, and a sheet ejecting belt 40. The processing tray 36 holds the sheets transported from the feed-out rollers 35. The end-aligning plate 37 aligns the rear ends of the sheets placed on the processing tray 36. The side-aligning plates 38a and 38b align the sheets at both sides in the width direction. The binding units 50 and 60 perform different binding processes on the sheets aligned on the processing tray 36. The paddle 39 snatches the sheets from the processing tray 36 toward the end-aligning plate 37. The sheet ejecting belt 40 ejects the sheets from the processing tray 36 to the accumulating section 32. Further, an ejected sheet sensor S2 is provided to detect any sheet being transported by the sheet ejecting belt 40.

The sheets having images formed on them are guided through the transport path 33 and sequentially ejected onto the processing tray 36. On the processing tray 36, the sheets are aligned, one by one, by the end-aligning plate 37, the side-aligning plates 38a and 38b and paddle 39, and are set at a preset position. The sheets so positioned are bound together by one of the binding units 50 and 60. The sheets bound together are conveyed by the sheet ejecting belt 40 to the accumulating section 32.

The accumulating section 32 has an accumulating tray 41 which is configured to accumulate the sheets conveyed by the sheet ejecting belt 40. The accumulating tray 41 can move up and down. As the sheets increases in number, the accumulating tray 41 gradually moves downwards. Therefore, the distance between the sheet outlet port and the uppermost sheet on the accumulating tray 41 can be maintained constant. This achieves desirable alignment of sheets.

Figure 3:
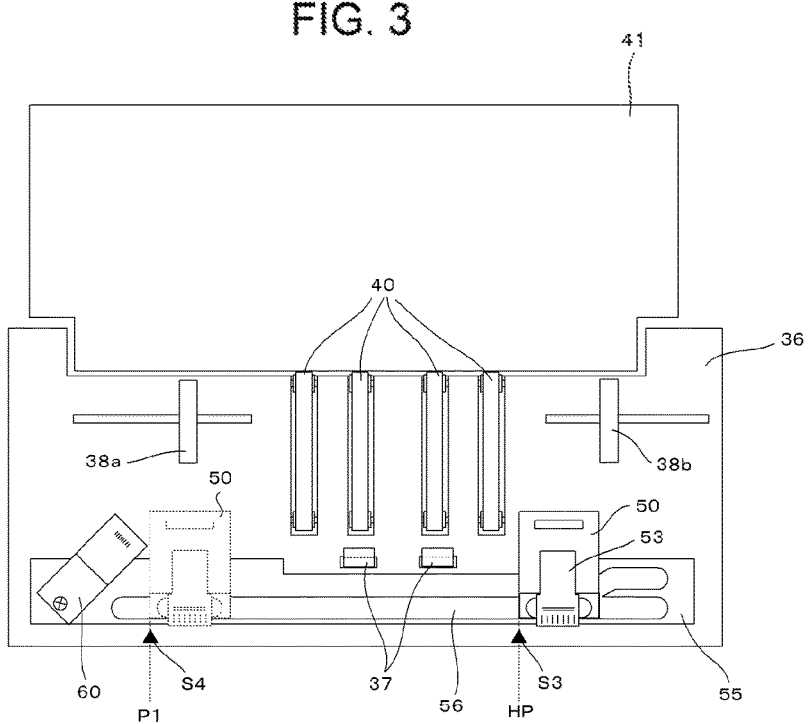
FIG. 3 is a schematic top view showing the major components of the post-processing section of the sheet binding apparatus according to this invention.

FIG. 3 is a schematic top view showing the major components of the post-processing section 30. With reference to FIG. 2 and FIG. 3, the two binding units 50 and 60 will be described. The needle binding unit 50 is a needle binding unit which binds sheets with needles. The binding unit 60 is a non-needle binding unit which binds sheets without using needles.

The non-needle binding unit 60 is provided at the side of the image forming system 1, where the user stands. That is, the non-needle binding unit 60 is provided in the front part of the sheet post-processing apparatus 5. The needle binding unit 50 is provided at the rear (back) of the non-needle binding unit 60.

As shown in FIG. 2, the needle binding unit 50 has a driver 51 and a clincher 52. The driver 51 is configured to drive needles at prescribed positions of sheets as shown in FIG. 2. The clincher 52 is configured to bend down the tip of each needle driven into the sheets. The needle binding unit 50 of this embodiment can bind at most 50 sheets together, and the driver 51 and the clincher 52 are so spaced apart that 50 sheets may be placed between them.

Further, as shown in FIG. 3, the needle binding unit 50 can move along guide rails 56 provided on a support plate 55 that supports the needle binding unit 50. The guide rail 56 extends along one rear end of each sheet, and the guide rail 56 moves along the one rear end of each sheet. To bind the sheets with needles, at the rear end, the needle binding unit 50 is moved to the ends of the sheets, away from the side where the non-needle binding unit 60 is arranged. To bind the sheets with needles, at two parts, the needle binding unit 50 is moved to these parts spaced apart across that part middle in the widthwise direction of the sheets. In FIG. 3, S3 indicates a home position sensor for detecting that the needle binding unit 50 has moved to home position HP, and S4 indicates a needle-replenishing sensor for detecting that the needle binding unit 50 has moved to needle-replenishing position P1.

The non-needle binding unit 60 has a so-called "press binding function," and clamps sheets with a pair of toothed members, pressing the sheets and entangling the sheets' fibers, thereby binding the sheets together. Besides the press binding, some other non-needle binding methods are available, such as half-pulling binding, cut-bend binding, and pierce binding (i.e., cutting and bending sheets, and then passing thread through the holes made in the sheets). As described above, the non-needle binding unit 60 is secured at the front of the sheet post-processing apparatus 5, outside the area in which the needle binding unit 50 can move.

The non-needle binding unit 60 can bind sheets by means of press binding, though it has a simple configuration. However, it can bind but five sheets or less at a time, far less than the needle binding unit 50 does. Therefore, the distance between the toothed members is shorter than the distance between the driver 51 and the clincher 52 of the needle binding unit 50.

Figure 4:
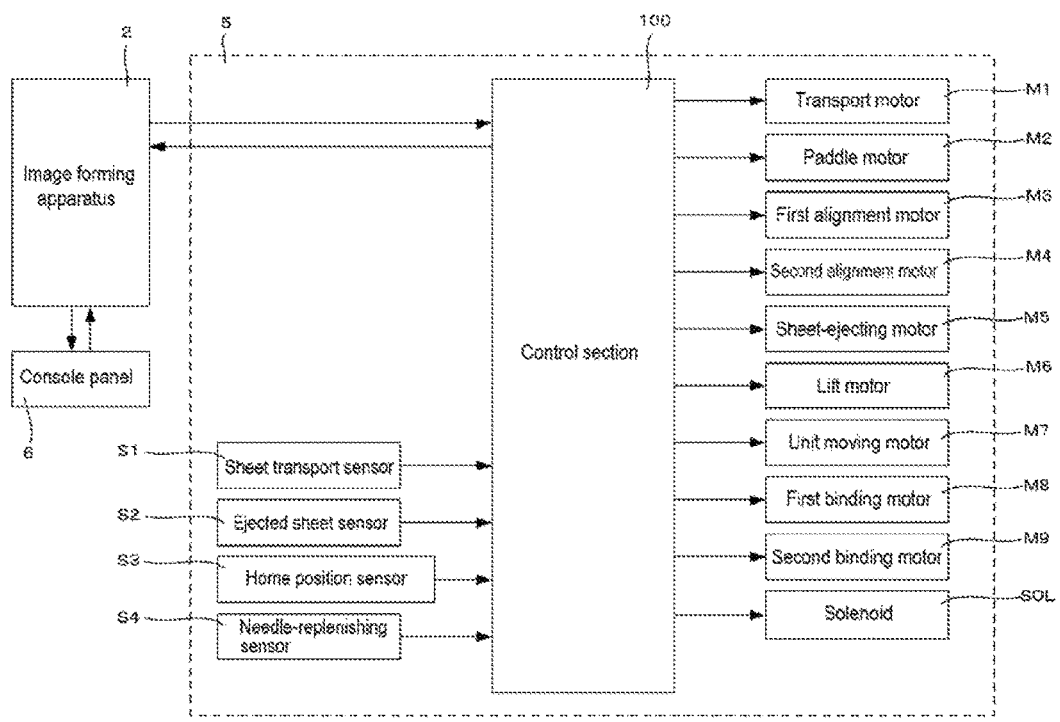
FIG. 4 is a block diagram showing the control system of the sheet binding apparatus according to this invention.

FIG. 4 is a block diagram showing the control system of the sheet post-processing apparatus 5. The sheet post-processing apparatus 5 has a control section 100. The control section 100 comprises a one-chip microcomputer incorporating a CPU, a ROM and a RAM, and exchanges various data, such as sheet data and post-processing data, with the image forming apparatus 2.

The control section 100 controls the drive sources of a transport motor M1, a paddle motor M2, first and second alignment motors M3 and M4, a sheet-ejecting motor M5, a lift motor M6, and a solenoid SOL, in accordance with the various data items coming from the image forming apparatus 2 and with the detection signals coming from a sheet transport sensor S1 and an ejected sheet sensor S2. Controlled by the control section 100, the transport motor M1 drives the feed-in rollers 34 and the feed-out rollers 35, the paddle motor M2 drives the paddle 39, the first and second alignment motors M3 and M4 drive the first and second side-aligning plates, respectively, the sheet-ejecting motor M5 drives the sheet ejecting belt 40, the lift motor M6 moves the accumulating tray 41 up or down, and the solenoid SOL moves the paddle 39 up or down.

Further, the control section 100 controls a unit moving motor M7 in accordance with the various data items coming from the image forming apparatus 2 and the detection signals coming from the home position sensor S3 and needle-replenishing sensor S4, thereby moving the needle binding unit 50 along the guide rail 56. Moreover, the control section 100 controls the first binding motor M8 provided in the needle binding unit 50 and configured to operate the same, and the second binding motor M9 provided in the non-needle binding unit 60 and configured to operate the same, whereby the sheets are bound with needles or with non-needles.

Figure 5:
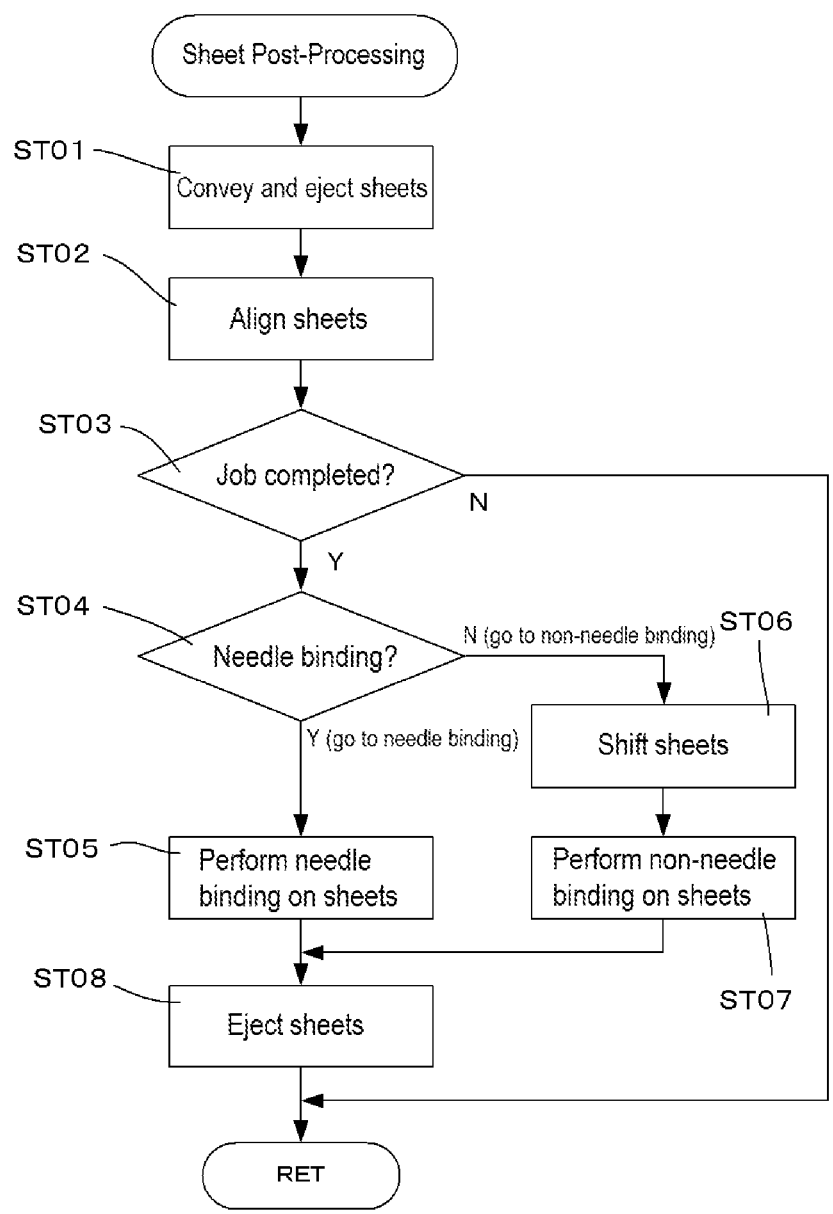
FIG. 5 is a flowchart illustrating the sheet bundling process performed by the sheet binding apparatus according to this invention.

FIG. 5 is a flowchart illustrating the sheet post-process of binding sheets together. FIGS. 6A to 6D are diagrams showing how the needle binding unit 50 or the non-needle binding unit 60 performs sheet binding. FIGS. 7A and 7B are perspective views showing how needles are replenished in the needle binding unit 50 and how the needle binding unit 50 is maintained in good conditions.

Figure 6A:
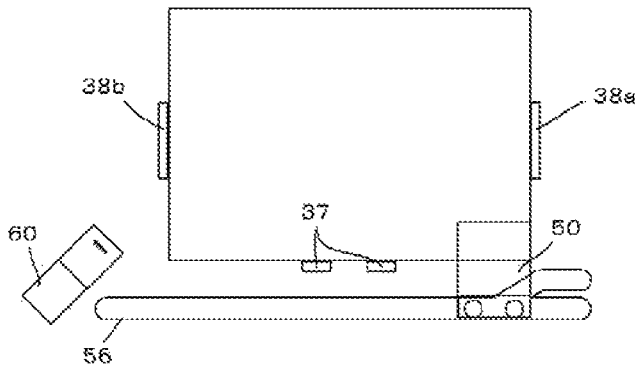
FIGS. 6A to 6D are diagrams showing how the needle binding unit or the non-needle binding unit bundles sheets and how the needle binding unit is replenished with needles, in the sheet binding apparatus according to this invention.
Figure 6B:
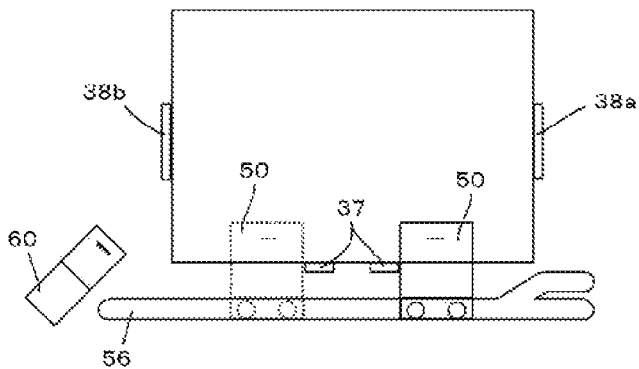
Figure 6C:
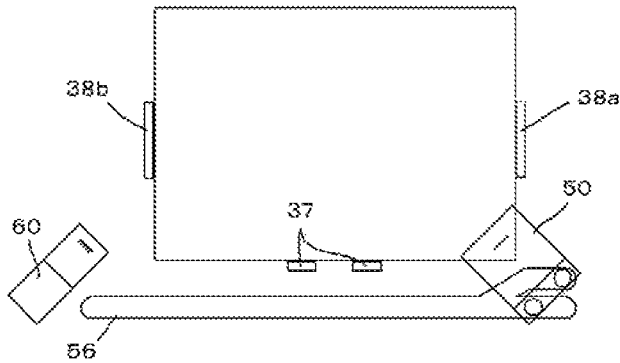
Figure 6D:
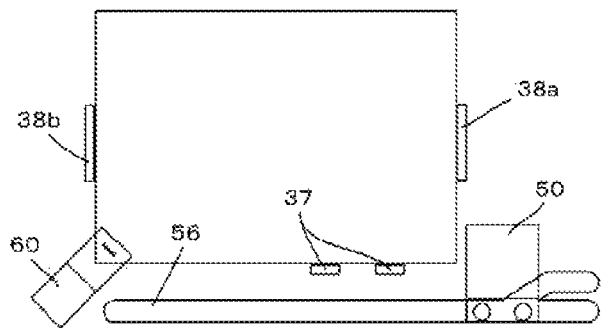
Figure 7A:
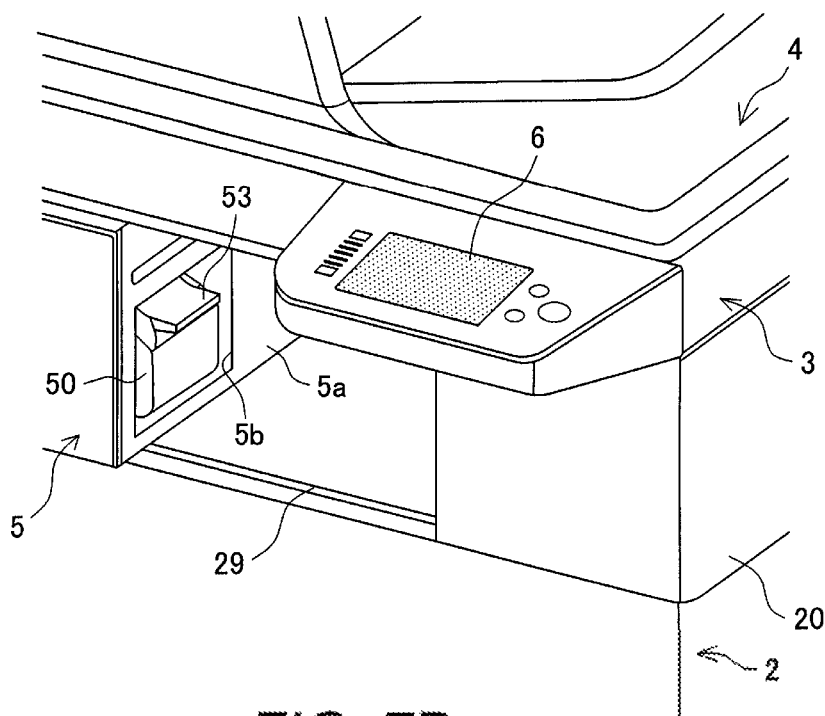
FIG. 7A and FIG. 7B are perspective views showing how the needle cartridge is exchanged with a new one in the needle binding unit and how the non-needle binding unit undergoes maintenance, in the sheet binding apparatus according to this invention.
Figure 7B:
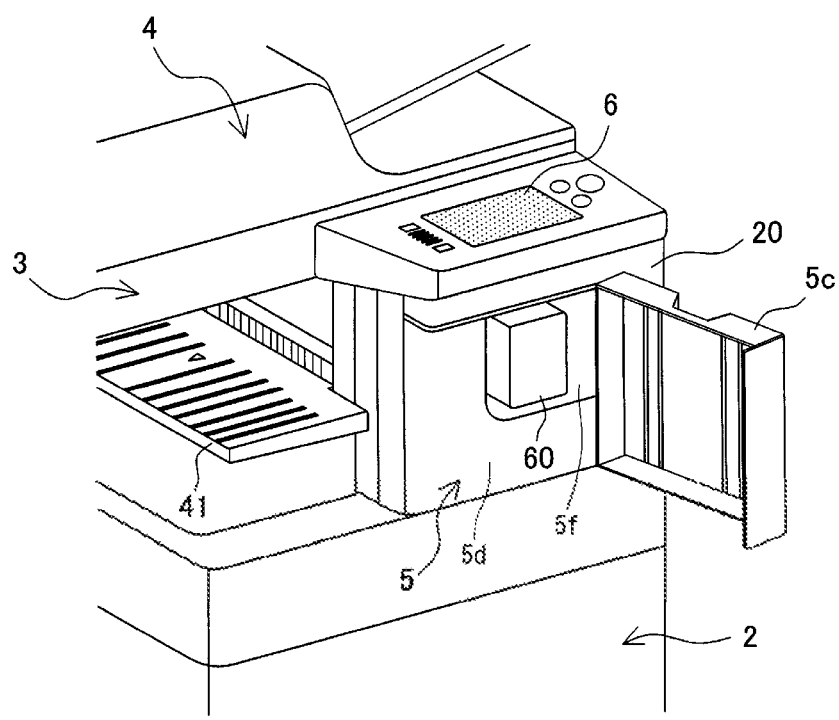

With reference to FIG. 5 and FIGS. 6A and 6B, it will be described how the sheet post-processing is performed. First, the sheets are conveyed and ejected (ST01). That is, the sheets are conveyed and ejected by driving the transport motor M1 in accordance with the sheet transfer signal coming from the image forming apparatus 2. As the transport motor M1 is so driven, the feed-in rollers 34 and the feed-out rollers 35 rotate, conveying the sheets delivered from the image forming apparatus 2 to the processing tray 36.

Next, the sheet aligning is performed (ST02). More precisely, when the sheet transport sensor 51 detects the rear end of a sheet, the solenoid SOL is operated and the paddle motor M2 is driven at the same time. Then, the paddle 39 is moved down and rotated. The paddle 39 contacts the sheet transported onto the processing tray 36, and moves the sheet toward the end-aligning plate 37. As its rear abuts on the end-aligning plate 37, the sheet is aligned at rear end.

After the sheet has been aligned at rear end, the first and second alignment motors M3 and M4 are driven, moving the side-aligning plates 38a and 38b to the positions that accord with the width of the sheet. The side-aligning plates 38a and 38b therefore abut on the sides of the sheet, respectively, and align the sheet in their widthwise direction (see FIG. 6A).

When the sheet is aligned on the side-aligning plates 38a and 38b, it is determined whether the job has been completed or not (ST03). If the job is not completed, and must be continued, the sheet post-processing is terminated, without performing the next process. As a result, sheets are sequentially transported onto the processing tray 36 and are aligned with one another. If the job is ended, the needle binding or the non-needle binding is performed. Every time one sheet is supplied to the sheet post-processing apparatus 5, a job continuation command or a job terminating command is transmitted from the image forming apparatus 2. The type of the sheet binding process to perform, i.e., needle binding or non-needle binding, is selected by the user at a console panel 6 before the job is started.

If the needle binding is selected and the job is terminated, the needle binding unit 50 is moved from the home position HP, and binds the sheets at the prescribed binding part (ST04 and ST05). In this embodiment, the needle binding can be performed in two modes, "two-part binding mode" and "end binding mode." In the two-part binding mode, the sheets are bound at two rear-end parts. In the end binding mode, the sheets are bound at the rear side (deep side) of the sheet post-processing apparatus 5. Either the two-part binding mode or the end binding mode is selected and performed in the above-mentioned needle binding.

If the two-part binding is selected, the unit moving motor M7 is driven in the forward direction. The unit moving motor M7 is stopped when the needle binding unit 50 is moved for a distance (or time), from the home position HP to the first binding position. The needle binding unit 50 is thereby moved to a position corresponding to the first binding position. Then, the first binding motor M8 is driven, whereby the sheets are bound at the first binding position. When the sheets are bound at the first binding position, the unit moving motor M7 is driven again in the forward direction. The unit moving motor M7 is stopped when the needle binding unit 50 is moved for a distance (or time), from the first binding position to the second binding position. Then, the first binding motor M8 is driven, whereby the sheets are bound at the second binding position (see FIG. 6B).

If the end binding mode is selected, the unit moving motor M7 is driven in the reverse direction. The unit moving motor M7 is stopped when the needle binding unit 50 is moved for a distance (or time), from the home position HP to the end-binding position (i.e., rear position). The needle binding unit 50 is thus moved to a position corresponding to the rear end of each sheet. Then, the sheets are shifted to a position corresponding to the needle binding unit 50, and are needle-bound. To shift the sheets so, the first and second alignment motors M3 and M4 are driven, moving the first and second side-aligning plates 38a and 38b toward the needle binding unit 50, namely toward the rear side of the sheet post-processing apparatus 5. Thereafter, the first binding motor M8 is driven, needle-binding the sheets at their rear ends (see FIG. 6C).

The needle binding unit 50 is configured to move toward the front along one side of each sheet as the unit moving motor M7 is driven in the forward direction, and to move toward the rear along that side of each sheet as the unit moving motor M7 is driven in the reverse direction. The distance the needle binding unit 50 is moved by the unit moving motor M7 is a value set at the image forming apparatus 2 in accordance with the sheet size and the binding mode selected.

If the non-needle binding is selected and the job is ended, the sheets are shifted to the position corresponding to the non-needle binding unit 60, and the non-needle binding is performed on the sheets (ST04, ST06 and ST07). More specifically, the first and second alignment motors M3 and M4 are driven, moving the first and second side-aligning plates 38a and 38b contacting both sides of each sheet, respectively, toward the non-needle binding unit 60, namely toward to the front of the sheet post-processing apparatus 5. The sheets are thereby guided by the second side-aligning plate 38b toward the front of the sheet post-processing apparatus 5, as viewed in the sheet width direction. When the ends of the sheets reach the position corresponding to the toothed members of the non-needle binding unit 60, the first and second alignment motors M3 and M4 are stopped and the non-needle binding unit 60 is operated. The non-needle binding is thereby performed at the ends of the sheets (see FIG. 6D).

The first and second alignment motors M3 and M4 are driven to move the second side-aligning plate 38b after the first side-aligning plate 38a starts moving. That is, the first side-aligning plate 38a is moved to the prescribed position associated with the toothed members of the non-needle binding unit 60 and is stopped. One side of each sheet conveyed abuts on the first side-aligning plate 38a so stopped. The sheets are therefore aligned again, forming a desirable bundle.

When the needle binding or the non-needle binding is completed, the sheet-ejecting motor M5 is driven, driving the sheet ejecting belt 40 in the sheet ejecting direction. The sheets are thereby ejected onto the accumulating tray 41.

In this embodiment, the needle binding is performed in two modes, the two-part binding mode of binding sheets at two rear-end parts, and the end binding mode of binding the sheets at an end part at the rear side (deep side) of the sheet post-processing apparatus 5. Further, the needle binding can be performed in a second end binding mode of binding the sheets at an end part in front of the sheet post-processing apparatus 5. In the second end binding mode, the guide rail 56 guides the needle binding unit 50 to the front ends of the sheet, and the unit moving motor M7 and the first binding motor M8 are controlled, thereby moving the needle binding unit 50 and stops the same at the binding position for binding operation. In the end binding mode according to this embodiment, the sheets are bound slantwise to their sides. Instead, the sheet may be bound parallel to their sides. Moreover, the guide rail 56 may be shaped to guide the needle binding unit 50 to the sheet-binding position that accords with the binding mode selected.

As shown in FIG. 6A, the home position HP of the needle binding unit 50 is set within the area into which the sheets are fed by the feed-out rollers 35 and snatched by the paddle 39. Therefore, the sheet post-processing apparatus 5 can be made small. Furthermore, since the non-needle binding unit 60 is provided outside the area in which the sheets are accumulated after ejected by the feed-out rollers 35, and shifts the sheets as shown in FIG. 7B and then performs non-needle binding on the sheets. Therefore, the non-needle binding unit 60 does not prevent the feed-out rollers 35 from ejecting the sheets or the paddle 39 from snatching the sheets.

FIG. 7A is a perspective view illustrating how a needle cartridge 53 is exchanged in the needle binding unit 50. The needle binding unit 50 holds the needle cartridge 53. When the needle cartridge 35 becomes empty, it is replaced by a new cartridge full of needles, thus replenishing needles.

The needle cartridge 35 is replaced by a new needle cartridge at a needle-replenishing position P1. The needle-replenishing position P1 is adjacent to the non-needle binding unit 60 held immovable, or is provided in the vicinity of the front ends of the sheets aligned on the processing tray 36. That is, the needle-replenishing position P1 is located more front than the midpoint of the distance the needle binding unit 50 moves, so that the user may replace the cartridge with a new one at the front of the sheet post-processing apparatus 5.

To exchange the needle cartridge 35 with a new one in the needle binding unit 50, the unit moving motor M7 is driven in the forward direction, moving the needle binding unit 50 from the home position to the needle-replenishing position P1 that is adjacent to the non-needle binding unit 60. When the needle-replenishing sensor S4 detects the needle binding unit 50, the unit moving motor M7 is stopped. As a result, the needle binding unit 50 is held at the needle-replenishing position P1 (see FIG. 3). In this embodiment, the needle binding unit 50 has a sensor flag (not shown) at its front end. The sensor flag may be detected by the home position sensor S3 and needle-replenishing sensor S4. In this case, it is determined that the needle binding unit 50 has reached the home position HP the needle-replenishing position P1.

The image forming apparatus 2 has rails 29 for guiding the sheet post-processing apparatus 5. The sheet post-processing apparatus 5 can move between the coupling position where it may be coupled to the ejecting section 20 and the position which is spaced apart from the coupling position.

While the needle binding unit 50 remains at the home position HP and needle-replenishing position P1, the user manually moves the sheet post-processing apparatus 5 in the sheet ejecting direction. The sheet post-processing apparatus 5 is thus moved from the coupling position along the rails 29. The side 5a of the sheet post-processing apparatus 5 coupled to the ejecting section 20 of the image forming apparatus 2 is therefore exposed as shown in FIG. 7A. The side 5a has an opening 5b in the part located at the needle-replenishing position P1 of the needle binding unit 50. Through this opening 5b, the needle binding unit 50 at the needle-replenishing position P1 can be seen.

While the side 5a of the sheet post-processing apparatus 5 remains exposed, the user manually removes the needle cartridge 53 from the needle binding unit 50 through the opening 5b made in the side 5a. The user then inserts a new needle cartridge 53 into the needle binding unit 50 through the opening 5b made in the side 5a.

In this embodiment, the opening 5b remains open at all times. However, the user may close the opening 5b by using, for example, a shield plate, and may then manually move or remove the shield plate to open the opening 5b, in order to exchange the empty needle cartridge 53 with a new needle cartridge.

To perform a maintenance work (including inspection, adjustment and repair) to keep the needle binding unit 50 in good conditions, the user moves the needle binding unit 50 to the needle-replenishing position P1 in the same way as in replenishing needles. The user then moves the sheet post-processing apparatus 5 along the rails 29, exposing the needle binding unit 50, inserts tools through the opening 5b, and performs the maintenance work.

FIG. 7B is a perspective view showing how the maintenance work is performed on the non-needle binding unit 60. As may be seen from FIG. 7B, the front cover 5c of sheet post-processing apparatus 5 (i.e., cover provided at the front of the apparatus 5) can rotate around its one end (i.e., fulcrum). The front cover 5c may be rotated to open the sheet post-processing apparatus 5. Once the apparatus 5 is so opened, the inner front 5d of the sheet post-processing apparatus 5 is exposed. The inner front 5d has an opening 5f, and the non-needle binding unit 60 arranged at the front of the sheet post-processing apparatus 5 is exposed through the opening 5f. Hence, the non-needle binding unit 60 can be put to maintenance work if the front cover 5c is rotated.

The image forming apparatus 2 is controlled in accordance with the binding mode selected at the console panel 6 to print and eject sheets. FIG. 8 is a diagram showing how sheets are transported onto the processing tray 36 in accordance with the needle binding mode or the non-needle binding mode.

To bind sheets at the upper-left corner of the original document D as shown in FIG. 8, the image forming apparatus 2 ejects sheets PA1 sequentially onto the processing tray 36, placing each sheet facing downward, if the needle binding mode is selected. The sheets PA1, i.e., the first sheet (first page) to the last sheet (Nth page), are therefore sequentially laid on the processing tray 36, one upon another, each having the printed side facing down, as shown in FIG. 8. The sheets PA1 are then needle-bound at the upper-left corner as the original document D is bound. If the non-needle printing is selected, the image forming apparatus 2 rotates the original document D by 180°, prints the document D on sheets PA2, and ejects the last-page sheet (Nth page) to the first-page sheet (first page) sequentially. As a result, the last page (Nth page) to the first page are sequentially laid on the one upon another, each having the printed side facing up as shown in FIG. 8, and are then non-needle-bound at the upper-left corner as the original document D is bound. Thus, the sheets can be bound at the upper-left corner as the original document D, in both the needle binding mode and the non-needle binding mode.

Figure 9A:
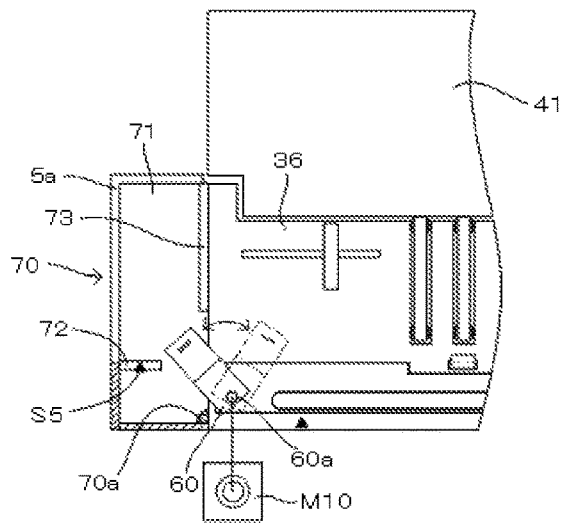
FIGS. 9A to 9C are top views showing the configuration of the manual binding section of the sheet binding apparatus according to this invention, and illustrating how the manual bending section binds sheets together.
Figure 9B:
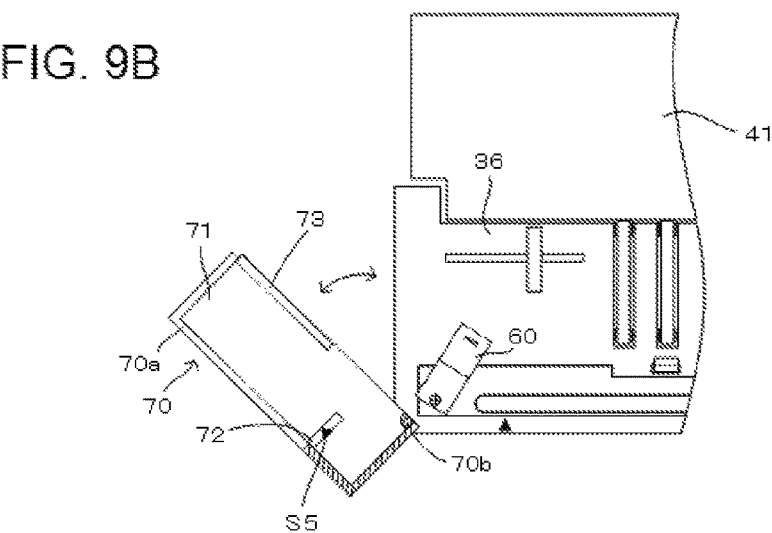
Figure 9C:
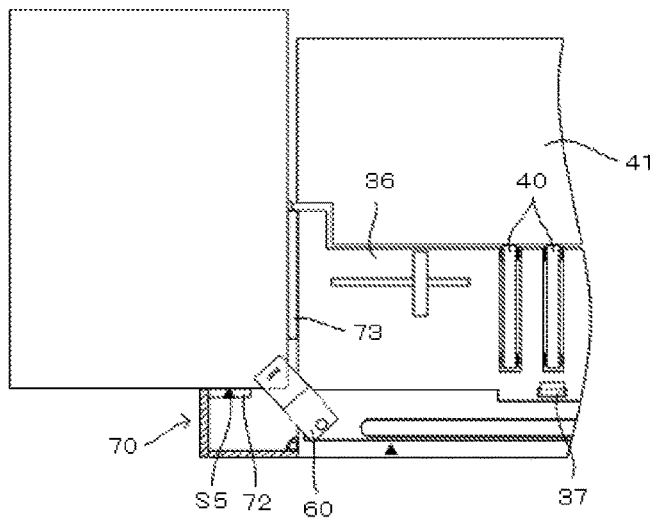
Figure 10:
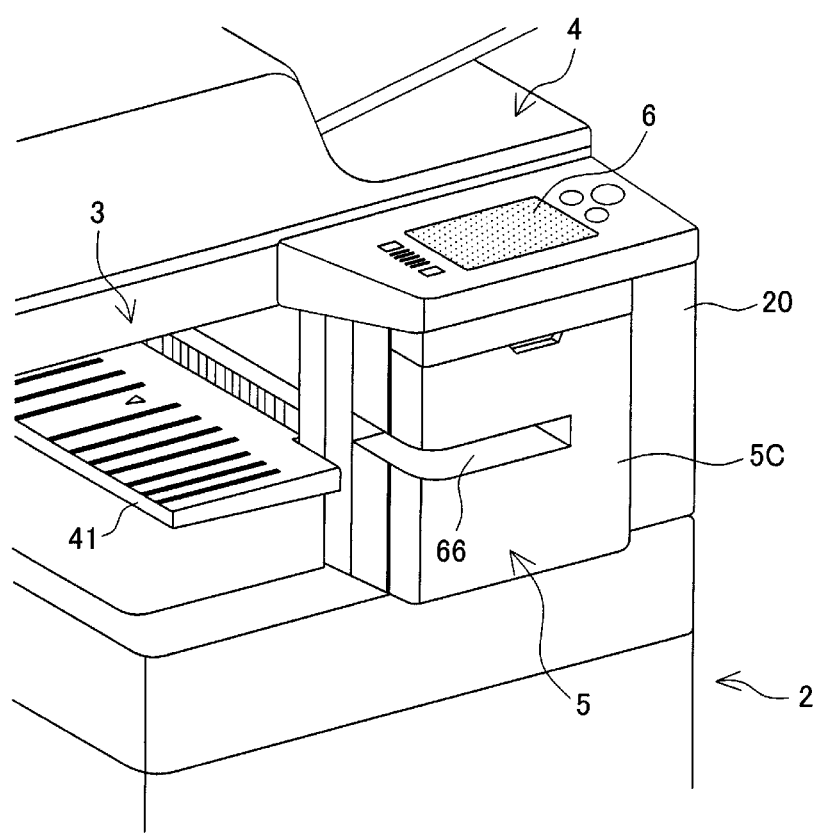
FIG. 10 is a perspective view showing the outer appearance of the manual binding section of the sheet binding apparatus according to the present invention.

A modification of the embodiment described above will be explained. The embodiment comprises a manual binding section 70, which the user manually operates to bind sheets. The manual binding section 70 may be rotated, together with the front cover 5c of the sheet post-processing apparatus 5, thereby exposing the non-needle binding unit 60. The non-needle binding unit 60 can thereby be put to maintenance work. The manual binding section 70 is provided on the front of the processing tray 36 shown in FIG. 3. FIGS. 9A to 9C are diagrams for explaining the manual binding section 70. More specifically, FIG. 9A is a top view showing the configuration of the manual binding section 70, FIG. 9B shows how the non-needle binding unit 60 binds the sheets inserted into the manual binding section 70, and FIG. 9C shows how the manual binding section 70 is rotated, exposing its interior. FIG. 10 is a perspective view showing the outer appearance of the manual binding section 70.

As shown in FIG. 10, the outer shell of the manual binding section 70, namely the front cover 5c of the sheet post-processing apparatus 5, has a sheet insertion hole 66 that functions for manual binding and through which sheets may be inserted into the sheet post-processing apparatus 5. As shown in FIG. 9A, the manual binding section 70 has a manual processing tray 71, a manual side-aligning plate 73, a manual front-end aligning plate 72, and a manual alignment sensor S5. The manual processing tray 71 supports the sheets inserted into the manual binding section 70 through the sheet insertion hole 66. The manual side-aligning plate 73 aligns the sheets inserted through the sheet insertion hole 66, at one side in the sheet width direction. The manual front-end aligning plate 72 aligns, at front end, the sheets inserted through the sheet insertion hole 66. The manual alignment sensor S5 detects that each sheet has reached the manual front-end aligning plate 72.

To bind the sheets in the manual binding section 70, the manual binding mode is selected at the console panel 6. When the manual binding mode is selected at the console panel 6, the non-needle binding unit 60 is moved from the first position (i.e., position indicated by broken lines in FIG. 9A) where the non-needle binding unit 60 binds the sheets on the processing tray 36, to the second position (i.e., position indicated by solid lines in FIG. 9B) where the non-needle binding unit 60 binds sheets on the manual processing tray 71. After the non-needle binding unit 60 is moved to the second position, the user inserts the sheets through the sheet insertion hole 66. The sheets abut, at front end, on the manual front-end aligning plate 72. At this time, the user moves the sheets, sliding them on the manual side-aligning plate 73 until they abut, at one side, the manual front-end aligning plate 72. The sheets are thereby set in the appropriate manual binding position. When the sheets abut on the manual front-end aligning plate 72, the manual alignment sensor S5 detects the sheets. Upon the lapse of a predetermined time after the manual alignment sensor S5 detects the sheets, the non-needle binding unit 60 automatically operates for non-needle binding on the sheets, as shown in FIG. 9C.

As shown in FIG. 9A, the non-needle binding unit 60 is configured to rotate around an axle 60a by a manual binding motor M10, and can move between the above-mentioned first and second positions in accordance with the binding mode selected.

As shown in FIG. 9B, the manual binding section 70 can freely rotate around an axle 70a. That is, the manual binding section 70 including the front cover 5c of the sheet post-processing apparatus 5 can rotate, with one end functioning as fulcrum. When the front cover 5c is rotated, opening the sheet post-processing apparatus 5, the non-needle binding unit 60 arranged at the front of the sheet processing apparatus 5 is exposed, enabling the user to perform the maintenance work on the non-needle binding unit 60.

The embodiments of the present invention, described above, are advantageous in the following respects.

Since the needle binding unit 50 is replenished with needles at the side where the non-needle binding unit 60 is arranged, it can be replenished with needles and the non-needle binding unit 60 can receive maintenance work at one side of the sheet post-processing apparatus 5. This facilitates both the needle replenishing in the needle binding unit 50 and the maintenance of the non-needle binding unit 60.

The non-needle binding unit 60 is arranged at the front of the sheet post-processing apparatus 5, and needles are replenished in the needle binding unit 50, also at the front of the sheet post-processing apparatus 5. It is therefore easy to replenish needles in the needle binding unit 50 and to perform the maintenance work on the non-needle binding unit 60.

Since the non-needle binding unit 60 is arranged at the front of the sheet post-processing apparatus 5 and the non-needle binding is performed on the front ends of the sheets, the non-needle bound parts of the sheets ejected onto the accumulating tray 41 can be visually confirmed. Further, since the sheets can be held at the non-needle bound side, they would never be separated from one another as they are taken out from the non-needle binding unit 60.

To perform the needle binding on a large number of sheets, the sheets are sequentially transported, the first sheet first, onto the processing tray 36. To perform non-needle binding on a small number of sheets, the sheets are sequentially transported in reverse order, namely the last sheet first, onto the processing tray 36. Then, the sheets are bound at the upper-left ends relative to the image-forming surface. In both cases, the time required to bind the sheets can be short.

As specified above, the sheet post-processing apparatus 5 is moved, making it possible to replenish needle at one side of the sheet post-processing apparatus 5. It is therefore easy to replenish needles, although the non-needle binding unit 60 is arranged at the front of the sheet post-processing apparatus 5.

Since the non-needle binding unit 60 is arranged at the front of the sheet post-processing apparatus 5, the sheets can be needle-bound in the manual mode.

This application is based upon and claims the benefit of priority from the prior Japanese Patent Application No. 2017-109086, the entire contents of which are incorporated herein by reference.

What is claimed is:

1. A sheet binding apparatus comprising:
    a first binding unit provided to move along one side of each sheet and between both ends thereof, and configured to perform needle binding on the sheets,
    a second binding unit provided at one end of the side of each sheet, and configured to perform non-needle binding on the sheets,
    wherein a needle replenishing position where needles are replenished in the first binding unit is set at one end of each sheet located at the second binding unit, and
    a first opening for allowing an access to the first binding unit is made in one side of the sheet binding apparatus, and a second opening for allowing an access to the second binding unit is made in a front of the sheet binding apparatus.

2. The sheet binding apparatus according to claim 1, wherein the second binding unit is arranged in the front of the sheet binding apparatus.

3. The sheet binding apparatus according to claim 2, wherein the needle replenishing position is set closer to the second binding unit than to a midpoint of a distance the first binding unit moves.

4. The sheet binding apparatus according to claim 2, wherein a manual binding section having a sheet insertion hole is provided at the front of the sheet binding apparatus, and the second binding unit binds the sheets inserted through the sheet insertion hole into the manual binding section.

5. A sheet binding apparatus comprising:
    a transporting section configured to transport sheets;
    a processing tray configured to hold the sheets transported from the transporting section;
    an aligning device configured to align two end portions of the sheets in a sheet width direction on the processing tray;
    a first binding unit configured to perform needle binding on the sheets held on the processing tray;
    a second binding unit arranged at one end of the processing tray in the sheet width direction and configured to perform non-needle binding on the sheets held on the processing tray;
    a needle-replenishing position where needles are replenished in the first binding unit, the needle-replenishing position being located at the one end of the processing tray in the sheet width direction and adjacent to the second binding unit; and
    a moving mechanism configured to move the first binding unit to the needle-replenishing position,
    wherein the second binding unit binds sheets on the processing tray, at one end corner, and the first binding unit binds sheets on the processing tray, at the other end corner, and
    the aligning device shifts the sheets to the one end of the processing tray so that the second binding unit binds the sheets, and to the other end of the processing tray so that the first binding unit binds the sheets.

6. The sheet binding apparatus according to claim 5, wherein a front of the sheet binding apparatus has a first opening for accessing the second binding unit, and one side of the sheet binding apparatus has a second opening for accessing the first binding unit.

7. The sheet binding apparatus according to claim 5, further comprising a manual binding section having an insertion hole and a support member for supporting the sheets inserted in the insertion hole, wherein the second binding unit performs binding on the sheets supported by the support member.

8. An image forming system configured to form an image on a sheet and to perform a post-processing on the sheet, comprising:
    an image forming apparatus having an image forming section configured to form an image on a sheet, and a sheet ejecting section configured to eject the sheets coming from the image forming section; and
    a sheet binding apparatus having a processing tray configured to hold sheets to be bound together; a sheet feeding section configured to receive the sheets from the sheet ejecting section of the image forming apparatus and to feed the sheets to the processing tray; a first binding unit capable of moving in a sheet width direction orthogonal to a direction of feeding the sheets and configured to perform needle binding on the sheets on the processing tray; a second binding unit provided at one side of the processing tray, as viewed in the sheet width direction, and configured to perform non-needle binding on the sheets; a moving mechanism configured to move the first binding unit to a prescribed position at said one side of the processing tray; a first opening made in said one side of the processing tray and exposing at least one part of the first binding unit moved to the prescribed position; and a second opening made in the one side of the processing tray and exposing at least one part of the second binding unit.

9. The image forming system according to claim 8, wherein the first and second openings are made in different sides of the sheet binding apparatus.

10. The image forming system according to claim 8, wherein the first opening is made in a side of the sheet binding apparatus, which opposes the sheet feeding section of the sheet binding apparatus, and a guide mechanism is provided to move the sheet binding apparatus away from the sheet feeding section.

11. The image forming system according to claim 8, wherein a needle-replenishing position for replenishing the first binding unit with needles is set at one end of each sheet placed in the second binding unit.

12. The image forming system according to claim 8, further comprising a selecting section configured to select the first binding unit or the second binding unit, wherein if the second binding unit is selected, the image forming section of the image forming apparatus forms images rotated by 180° with respect to the images the image forming section forms if the first binding unit is selected.

* * * * *